March 31, 1936. G. COLMORGEN 2,035,535
WHEELBARROW
Filed July 18, 1935
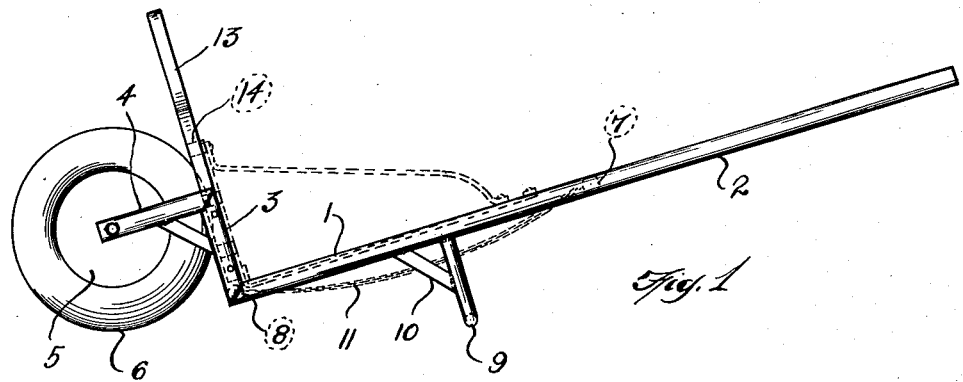
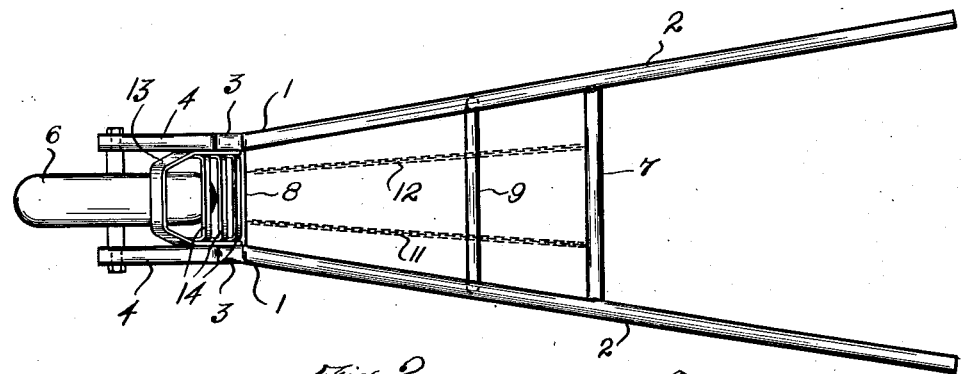
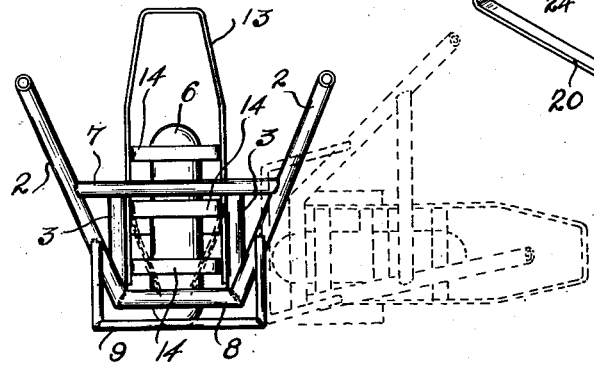
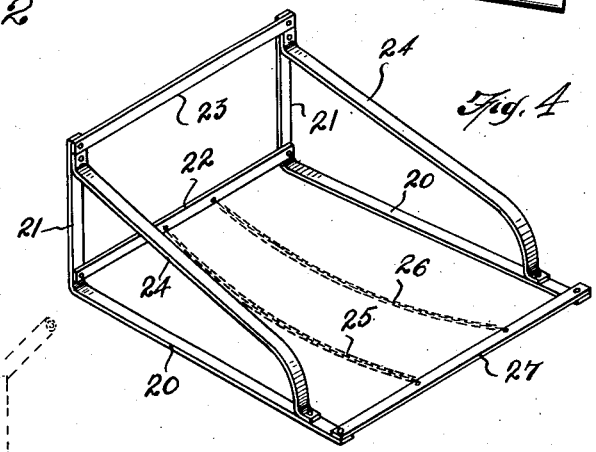
INVENTOR.
George Colmorgen
BY
Bay, Oberlin & Bay
ATTORNEYS.

Patented Mar. 31, 1936

2,035,535

UNITED STATES PATENT OFFICE 2,035,535

WHEELBARROW

George Colmorgen, Perry, Ohio

Application July 18, 1935, Serial No. 32,061

2 Claims. (Cl. 280—58)

This invention relates, as indicated, to wheelbarrows, but has reference more particularly to a wheelbarrow which has been designed primarily for use by landscape and rock gardners to transport heavy evergreen balls or other heavy balled nursery products, rocks, and stones to various places which are not accessible by delivery trucks and the like.

The present invention has as its primary object the provision of a wheelbarrow of such design and construction as to enable evergreen balls and similar nursery products to be handled and transported with considerable facility and with a minimum of labor and effort.

To the accomplishment of the foregoing and related ends, said invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Fig. 1 is a side elevation of a wheelbarrow embodying the novel features of the invention;

Fig. 2 is a plan view of the wheelbarrow;

Fig. 3 is a rear elevation of the wheelbarrow; and

Fig. 4 is a perspective view of an auxiliary support adapted to be mounted on the wheelbarrow.

Referring more particularly to Figs. 1, 2 and 3 of the drawing, the wheelbarrow comprises a pair of transversely spaced tubular steel members 1, each of which consists of a handle portion 2, a portion 3 which extends at substantially right angles to the portion 2, and an offset extension 4, the extensions 4 lying in a plane which is substantially parallel with a plane that includes the portions 2.

The extensions 4 form supports for a shaft upon which is rotatably mounted a wheel 5 carrying a pneumatic tire 6.

The members 1 are maintained in properly spaced relation by means of tubular steel cross-bars 7 and 8, which are welded at their ends to the handle portions 2 of the members 1, the cross-bar 7 being welded to the portions 2 at points intermediate the ends of such portions and the cross-bar 8 being welded to the portions 2 at the forward ends of the latter.

For the purpose of supporting the wheelbarrow when at rest, a U-shaped member 9 is provided, the arms of which are welded to the handle portions 2 at points intermediate the cross-bars 7 and 8. The member 9 is suitably braced by means of brace members 10.

To facilitate the transporting of evergreen balls and the like, flexible chains 11 and 12 are provided, which extend longitudinally of the wheelbarrow and are secured at their ends to the cross-bars 7 and 8. The carrying of evergreen balls is further facilitated by the provision of a front stop which lies in the plane of the portions 3 of the members 1 and comprises an inverted U-shaped member 13, the arms of which are riveted or otherwise secured to the portions 3, and a plurality of spaced cross-bars 14 interconnecting said arms.

It will be noted that the handle portions 2 of the members 1 are extremely long and diverge to a slight extent only; that they lie in a plane which is substantially tangential to the bottom of the periphery of the tire 6; and that they extend forwardly to a point which is spaced but a small distance from the surface upon which the wheelbarrow rests. In practice, this distance is approximately two inches. It will be further noted that the upright portions 3 of the members 1 as well as the front stop are also in a plane which is substantially tangential to the periphery of the tire 6.

The aforesaid design enables the wheelbarrow to be turned on its side so as to occupy the position indicated by the broken lines in Fig. 3, in which position the handle portions 2 of the members 1 lie in substantially a vertical plane, but with the lower handle member sufficiently above the ground surface to enable it to be grasped without difficulty.

With the wheelbarrow thus turned on its side, an evergreen ball or similar nursery product may be laid along the handle portions 2 of the wheelbarrow and in such a manner that the growth extends along the front stop 13. The wheelbarrow may then be righted and the evergreen ball, in the same operation, carried therewith to upright position. The only labor required in addition to that of righting the wheelbarrow will be that required to maintain the evergreen ball on the handle portion 2 during the righting movement. In this manner, the evergreen ball will be loaded with a minimum of labor and effort and a minimum of handling.

Due to the proximity of the forward ends of the handle portions 2 to the surface, over which the wheelbarrow is moved, the center of gravity of the load will be extremely close to such surface and loads of even considerable weight will therefore be transported with ease and facility. The unloading operations, which are merely the reverse of the loading operations, will likewise be conducted with a minimum of labor and handling. Due to the fact that the handles are extremely long and diverge to a slight extent only, the wheelbarrow may be moved with facility be-between rows of evergreen trees without danger of brushing against adjacent branches and the like.

For transporting small evergreen balls and similar small nursery products which are not difficult to pick up by hand, the auxiliary support shown in Fig. 4 may be employed. This device consists of transversely spaced members 20 having at their forward ends angularly extending upright portions 21, which, together with crossbars 22 and 23, form a front stop. The upright portions 21 are suitably braced, as by means of curved side bars 24, which extend from points adjacent the rear ends of the members 20 to the upper ends of the upright portions 21. Supporting chains 25 and 26 are also provided, which extend from the cross-bar 22 to a cross-bar 27 which interconnects the members 20 at their rear ends. This device may be placed on the wheelbarrow in the manner indicated by the broken lines in Fig. 1. It will be understood that this auxiliary support is not used when large evergreen balls are to be handled.

The wheelbarrow proper is made of a minimum number of parts which are welded together to form a unitary rigid structure. By using tubular parts, great strength is secured with a minimum of weight.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A wheelbarrow comprising a wheel and a pair of transversely spaced frame members, each of said frame members consisting of a handle portion, a portion extending at right angles thereto and a forwardly extending portion, said last named portion lying in a plane substantially parallel to and spaced from the plane in which said handle portion lies, cross bars interconnecting said frame members at longitudinally spaced points and chain members interconnecting said cross bars, said wheel being supported by the forwardly extending portions of said frame members, said handle portions lying in diverging vertical planes.

2. A wheelbarrow comprising a wheel and a pair of transversely spaced frame members, each of said frame members consisting of a handle portion, a portion extending at right angles thereto and a forwardly extending portion, said last named portion lying in a plane substantially parallel to and spaced from the plane in which said handle portion lies, cross bars interconnecting said frame members at longitudinally spaced points and chain members interconnecting said cross bars, said wheel being supported by the forwardly extending portions of said frame members, said handle portions lying in diverging vertical planes, and a front stop comprising an inverted U-shaped member secured to the portions extending at right angles to the handle portions, there being a plurality of bars connecting the arms of said U-shaped member.

GEORGE COLMORGEN.